(12) United States Patent
Nishiyama

(10) Patent No.: US 11,825,039 B2
(45) Date of Patent: Nov. 21, 2023

(54) SCANNING SYSTEM INCLUDING MESSAGE SHARING SYSTEM, PRINTING SYSTEM, IMAGE PROCESSING APPARATUS, AND METHOD

(71) Applicant: CANON KABUSHIKI KAISHA, Tokyo (JP)

(72) Inventor: Masashi Nishiyama, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 158 days.

(21) Appl. No.: 17/408,669

(22) Filed: Aug. 23, 2021

(65) Prior Publication Data
US 2022/0078292 A1 Mar. 10, 2022

(30) Foreign Application Priority Data
Sep. 7, 2020 (JP) .................................. 2020-150009

(51) Int. Cl.
H04N 1/00 (2006.01)
G06K 15/02 (2006.01)
H04L 51/046 (2022.01)

(52) U.S. Cl.
CPC ..... *H04N 1/00212* (2013.01); *G06K 15/1809* (2013.01); *H04L 51/046* (2013.01); *H04N 1/0044* (2013.01); *H04N 1/00233* (2013.01); *H04N 1/00241* (2013.01); *H04N 1/00244* (2013.01); *H04N 1/00278* (2013.01); *H04N 1/00798* (2013.01); *H04N 2201/0094* (2013.01)

(58) Field of Classification Search
CPC .......... H04N 1/00212; H04N 1/00233; H04N 1/00241; H04N 1/00278; H04N 1/0044; G06K 15/1809; H04L 51/046
See application file for complete search history.

(56) References Cited

U.S. PATENT DOCUMENTS

| | | | |
|---|---|---|---|
| 2014/0063562 A1* | 3/2014 | Lee .................... | H04N 1/00122 358/439 |
| 2015/0172505 A1* | 6/2015 | Park ................... | H04N 1/00307 358/1.15 |
| 2018/0131839 A1* | 5/2018 | Nakajima .......... | H04N 1/00344 |
| 2020/0099637 A1* | 3/2020 | Kurokawa ........... | H04N 1/0087 |
| 2020/0099799 A1* | 3/2020 | Obayashi .............. | G06F 3/1253 |

(Continued)

FOREIGN PATENT DOCUMENTS

JP 2019144698 A 8/2019

*Primary Examiner* — Nicholas Pachol
(74) *Attorney, Agent, or Firm* — ROSSI, KIMMS & McDOWELL LLP

(57) ABSTRACT

In a scanning system including a web application cooperating with a message sharing system and an image processing apparatus provided with a scanner, the web application holds card information acquired from a scanning request source and a destination of scan data in association with each other in response to a scanning request from a user account belonging to the message sharing system. An image processing apparatus transmits the scan data generated based on scanning and the card information that has been read to the web application. The web application specifies a destination associated with the card information that has been received from the image processing apparatus and posts the scan data that have been transmitted from the image processor to the message sharing system.

16 Claims, 15 Drawing Sheets

(56) References Cited

U.S. PATENT DOCUMENTS

| | | | |
|---|---|---|---|
| 2020/0099800 A1* | 3/2020 | Noguchi | H04N 1/00204 |
| 2020/0280641 A1* | 9/2020 | Hiramatsu | G06F 3/127 |
| 2020/0344375 A1* | 10/2020 | Ishii | G06F 3/1268 |
| 2022/0070331 A1* | 3/2022 | Kanemoto | H04N 1/32745 |

* cited by examiner

FIG. 7

| IC CARD IDENTIFICATION NUMBER | IMAGE PROCESSING APPARATUS IDENTIFICATION NUMBER | VALID PERIOD |
|---|---|---|
| 1120304858234A8C | 551e8300-e49b-21d4-a416-464445411100 | 2017/12/21 10:00 |
| 8234A8C112030485 | 8300551e-9be4-d421-16a4-811464445100 | 2017/12/21 10:02 |
| | | |

| IC CARD IDENTIFICATION NUMBER 1301 | DESTINATION OF SCANNED IMAGE 1302 | VALID PERIOD 1303 |
|---|---|---|
| 1120304858234A8C | USER A | 2017/12/21 10:00 |
| 8234A8C112030485 | GROUP X | 2017/12/21 10:02 |
| | | |

SCANNING SYSTEM INCLUDING MESSAGE SHARING SYSTEM, PRINTING SYSTEM, IMAGE PROCESSING APPARATUS, AND METHOD

BACKGROUND OF THE INVENTION

Field of the Invention

The present invention relates to a scanning system, a printing system, an image processing apparatus, and a method.

Description of the Related Art

Using a message application for what is referred to as "chatting", in which messages are exchanged between a plurality of user terminals via a network, is becoming widespread. The number of services using a Bot application to automatically respond to a message transmitted by a user on a messaging application is also increasing.

For example, Japanese Patent Laid-Open No. 2019-144698 proposes that, in a cloud printing service cooperating with a Bot application, a printing instruction is performed on a printing device on a network via a message application.

However, according to the disclosure of Japanese Patent Laid-Open No. 2019-144698, a device identification ID for identifying a multi-function peripheral, issued by the Bot application, needs to be input when the printing instruction is performed.

SUMMARY OF THE INVENTION

The present invention is to reduce the time and effort for inputting information in printing or scanning via a message sharing system.

A scanning system according to one embodiment of the present invention includes an information processing apparatus having a web application cooperating with a message sharing system and an image processing apparatus provided with a scanner. The information processing apparatus comprises: a memory storing instructions; and a processor executing instructions causing the web application to: request a scanning request source to provide card information in response to a scanning request from a user account belonging to the message sharing system; receive a specification of a communication space of the message sharing system or a specification of a message to the user account belonging to the message sharing system, to serve as a destination to which scan data generated based on scanning is to be transmitted; and hold the card information that has been read and the destination in association with each other. The image processing apparatus comprises: a memory storing instructions; and a processor executing instructions causing the image processing apparatus to: transmit the scan data generated based on scanning and the card information that has been read for posting the scan data to the message sharing system to the web application, wherein the instructions cause the web application to specify a destination in association with the card information that has been received from the image processing apparatus and post the scan data that have been transmitted from the image processing apparatus to the message sharing system.

A printing system according to one embodiment of the present invention includes an image processing apparatus having a web application cooperating with a message sharing system including a printing system, and an image processing apparatus provided with a printing device. The information processing apparatus comprising: a memory storing instructions; and a processor executing instructions causing the web application to: hold identification information of the image processing apparatus that has been acquired from the image processing apparatus and card information in association with each other; request a print request source to provide card information associated with the image processing apparatus and an image to be printed in response to a print request from a user account belonging to the message sharing system; and specify the image processing apparatus associated with the card information acquired from the print request source and instruct printing of the acquired image. The image processing apparatus comprises: a memory storing instructions; and a processor executing instructions causing the image processing apparatus to: execute printing of the image in accordance with a print instruction from the web application.

Further features of the present invention will become apparent from the following description of exemplary embodiments (with reference to the attached drawings).

BRIEF DESCRIPTION OF THE DRAWINGS

FIG. 7 illustrates a management table showing the association between the IC card and the image processing apparatus.

FIG. 13 illustrates a management table showing the association between the IC card and the destination of the scanned image.

DESCRIPTION OF THE EMBODIMENTS

Hereinafter, an embodiment of the present invention will be described with reference to the drawings and the like.

However, not all of the features described in the following embodiments are essential to the present invention.

In the first and second embodiments, an example of a service in which a Bot application used in a message sharing system and an image processing apparatus cooperate will be described. In this service, the image processing apparatus executes printing or scanning in accordance with an instruction from a user via a message application. Specifically, in the printing service, a user transmits a print request from a message application, and printing is performed on the image processing apparatus via the Bot application. In the scanning service, the user transmits a scanning request from the message application, scanning is performed on the image processing apparatus, and the scanned image is transmitted from the image processing apparatus to a desired destination using the message application via the Bot application.

Figure 1:
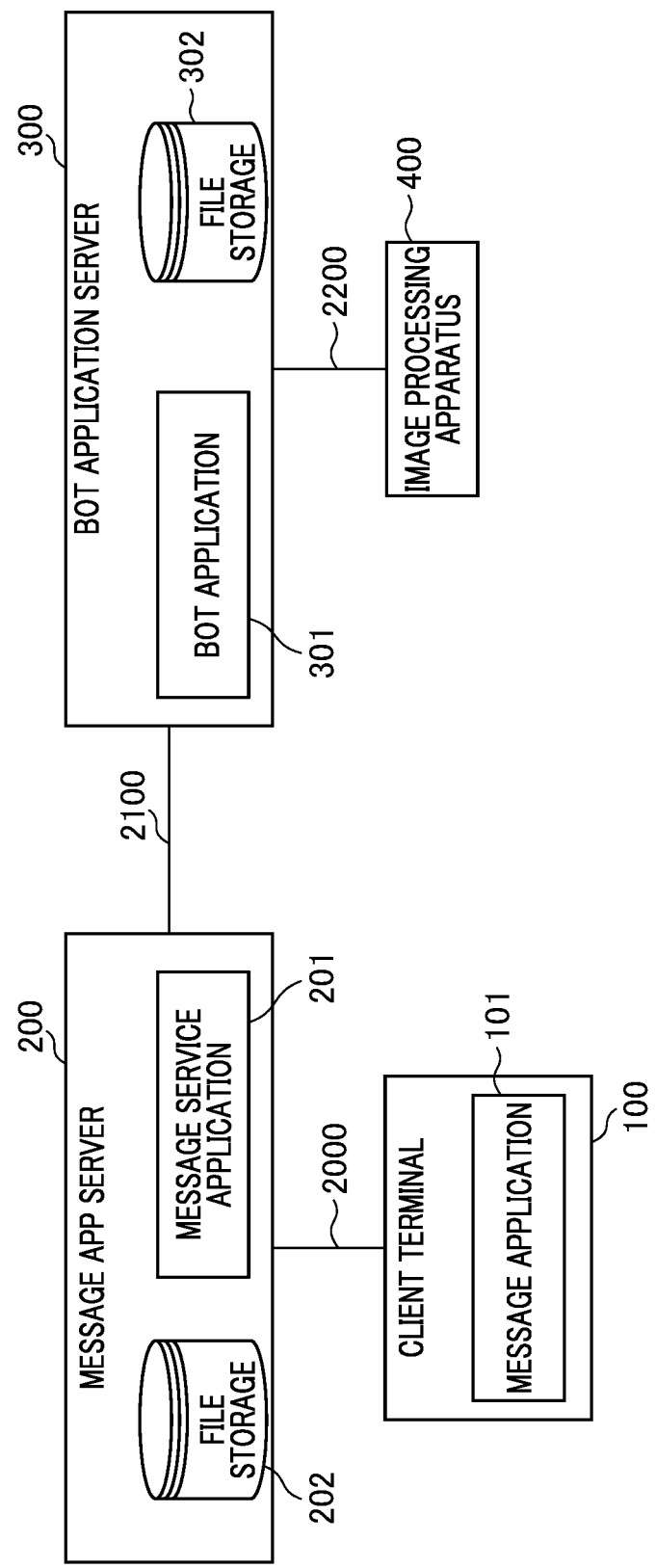
FIG. 1 illustrates a configuration example of a system.

FIG. 1 illustrates an example of a system configuration of the first embodiment and the second embodiment. The system functions as a scanning system in the first embodiment and functions as a printing system in the second embodiment. The system is provided with a client terminal 100, a message application server 200, a Bot application server 300, and an image processing apparatus 400. In FIG. 1, the message application server 200 is connected to the client terminal 100 via a network 2000 and is connected to the Bot application server 300 via a network 2100.

The message application can also transmit and receive messages to and from other client terminals via the message application server 200. Although one client terminal 100 is shown in the example of FIG. 1, the number of client terminals 100 in the scanning system may be two or more. In this case, the plurality of client terminals may have different hardware configurations.

The Bot application server 300 and the image processing apparatus 400 are connected so as to be capable of communicating with each other via the network 2200. If data can be transmitted and received, the network 2000, the network 2200, and the network 2200 may have any specification.

The client terminal 100 is a computer device operated by a user, and the examples of the client terminal include a PC (personal computer), a smartphone, and a tablet terminal. The client terminal 100 includes a message application 101 that is a software module for utilizing a message sharing system.

The message application 101 has a function for transmitting a message including a character string input by the user to a message service application 201, to be described below, via the network 2000. In addition, the message application 101 has a function for providing a notification about a message received from the message service application 201 via the network 2000 to the user.

The message application server 200 is a server installed to provide a message sharing system service to the message application 101. The message application server 200 includes the message service application 201 that is a software module and file storage 202. Although not shown in FIG. 1, the message application server 200 performs message relay processing during message exchange between a plurality of client terminals.

The message service application 201 receives a message transmitted from the message application 101 of the client terminal 100. The message service application 201 transmits a message reception event to a Bot application 301, to be described below, of the Bot application server 300. The message service application 201 transmits a message to the message application 101 based on a request from the Bot application 301. Additionally, the message service application 201 performs a process for storing the received image file in the file storage 202.

The file storage 202 is a storage device managed by the message application server 200. The file storage 202 stores an image file transmitted from the message application 101 of the client terminal 100, and an image file and a message transmitted from the Bot application 301.

The Bot application server 300 is a server installed to provide the function of the Bot application 301 cooperating with the message sharing system. The Bot application server 300 includes the Bot application 301, which is an example of a web application, and a file storage 302.

The Bot application 301 receives an event notification from the message service application 201 of the message application server 200, and executes a process corresponding to the contents of the received event. For example, the Bot application 301 issues a print request in response to a posting related to printing. Additionally, in response to a posting related to scanning, the Bot application 301 issues a scanning request to the image processing apparatus 400. Additionally, the Bot application 301 transmits a message transmission request to the message service application 201 via the network 2200 as necessary.

When the received event is the association and registration of the IC card and the image processing apparatus, the Bot application 301 stores the IC card identification number and the image processing apparatus identification number in association with each other. When the received event is a print request by the IC card, the Bot application 301 executes printing on the image processing apparatus associated with the IC card, in accordance with the IC card identification number and the image processing apparatus identification number that are stored in association with each other.

If the received event is the association and registration of the IC card and the destination of the scanned image, the Bot application 301 stores the IC card identification number and the destination in association with each other. If the received event is the transmission of the scanned image by the IC card, the Bot application 301 transmits the scanned image to the specified user or group according to the IC card identification number and the destination that have been stored in association with each other.

The Bot application 301 functions as a virtual user of the message service application 201, and can transmit and receive messages to and from the message application 101 of the client terminal 100.

The file storage 302 stores image files and messages received from the image processing apparatus 400. The file storage 302 also stores information about the association between the IC card and the image processing apparatus, and information about the association between the IC card and the scan image transmission reservation, which have been associated by the Bot application 301.

Although in the present embodiment, the Bot application 301 is placed on the Bot application server 300, a configuration in which the Bot application 301 exists on the image processing apparatus 400 may be used. The message application server 200 and the Bot application server 300 may be realized by a virtual machine (cloud service) that uses resources provided by a data center including a server device, in addition to the server device.

The image processing apparatus 400 is an apparatus having a printing function and a scanning function, for example, a multifunction peripheral (MFP). The image processing apparatus 400 has a printing device that forms an image on paper by using recording agents such as toner and ink. Additionally, the image processing apparatus 400 has a scanner device that reads an original and generates a scanned image. The image processing apparatus 400 may also have functions of copying, FAX transmission, and the like.

Figure 2:
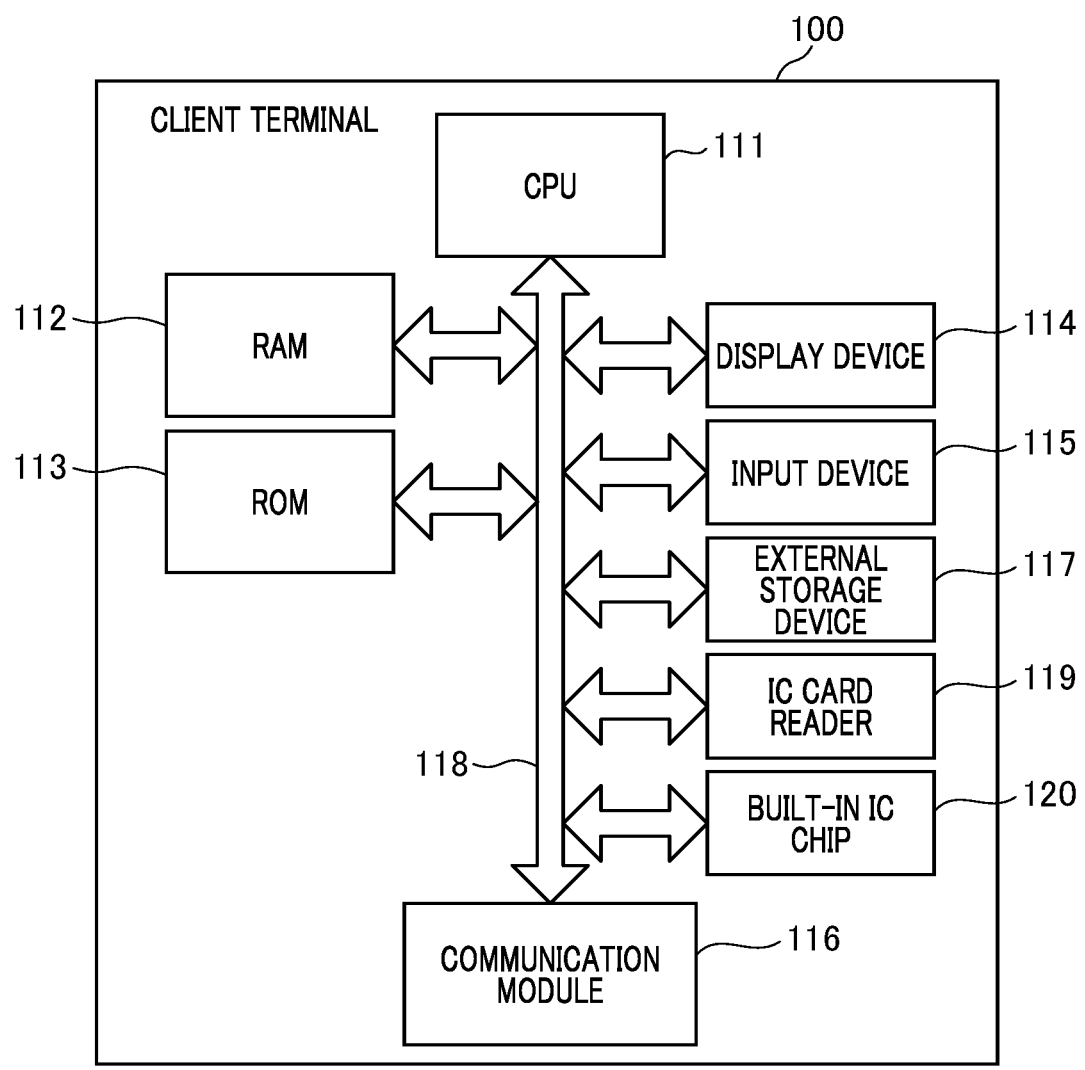
FIG. 2 illustrates a configuration example of a client terminal.

FIG. 2 illustrates an example of the hardware configuration of the client terminal 100. The client terminal 100 includes a CPU III, a RAM 112, a ROM 113, a display device 114, an input device 115, a communication module 116, an external storage device 117, an IC card reader 119, and a built-in IC chip 120. These components are connected via a system bus 118 so as to exchange data with each other.

The CPU (Central Processing Unit) 111 performs various types of calculation processing according to programs stored in the RAM 112 and the ROM 113, and controls the entire client terminal 100. The RAM (Random Access Memory) 112 is a volatile storage region and is used as a temporary storage region when the CPU 111 performs various types of processing. The ROM (Read Only Memory) 113 is a nonvolatile storage region and stores an operating system (OS), the message application 101, and other applications.

The display device 114 is a device that displays, for example, a graphic user interface (GUI), and includes a liquid crystal display and a graphic controller. The input device 115 is a device that receives a user's operation performed on the client terminal 100, and the examples of the input device 115 include a keyboard and a pointing device. The client terminal 100 performs various controls according to various instructions from the user, which have been received from the input device 115. In this context, the input device 115 may be a device externally attached to the client terminal 100. In the example of FIG. 2, the display device 114 and the input device 115 are independently shown in the client terminal 100. However, the display device 114 and the input device 115 may be configured as an integrated unit, for example, a touch panel display. By associating the input coordinates and the display coordinates on the touch panel, it is possible to configure a GUI such that the user can directly operate the screen displayed on the touch panel.

The communication module 116 is an interface for communicating with an external device. The communication module 116 is connected to a communication device (not illustrated), such as a router, and performs data communication with the message application server 200 via the network 2000. The data communication may be performed by wireless communication, communication via wired lines such as a telephone line and a LAN, or a combination thereof.

The external storage device 117 is a nonvolatile storage region. For example, if the client terminal 100 is a smartphone, a flash memory may be used as the external storage device 117. The system bus 118 exchanges data between the components included in the client terminal 100.

The IC card reader 119 is a device for reading information on an IC card. The IC card in the present embodiment is a non-contact IC card loaded with NFC (Near Field Communication) or the like or a terminal loaded with an IC chip. That is, the IC card includes an IC chip on which card information is written, and the IC card reader 119 reads the card information from the IC chip. For example, if the client terminal 100 is a smartphone, a smartphone application that is permitted to read the IC card can read the card information of the 1C card that is held over the back of the smartphone. The card information that can be read includes a number that can uniquely identify the IC chip (hereinafter, referred to as an "IC card identification number").

The built-in IC chip 120 is an IC chip built into the client terminal 100. The IC card identification number is written in the built-in IC chip 120 in the same way as the IC card. If the client terminal 100 is a smartphone, the smartphone itself can be used as an IC card by the built-in IC chip 120. Further, a smartphone application that is permitted to read the built-in IC chip 120 can read the IC card identification number written in the built-in IC chip 120.

Figure 3:
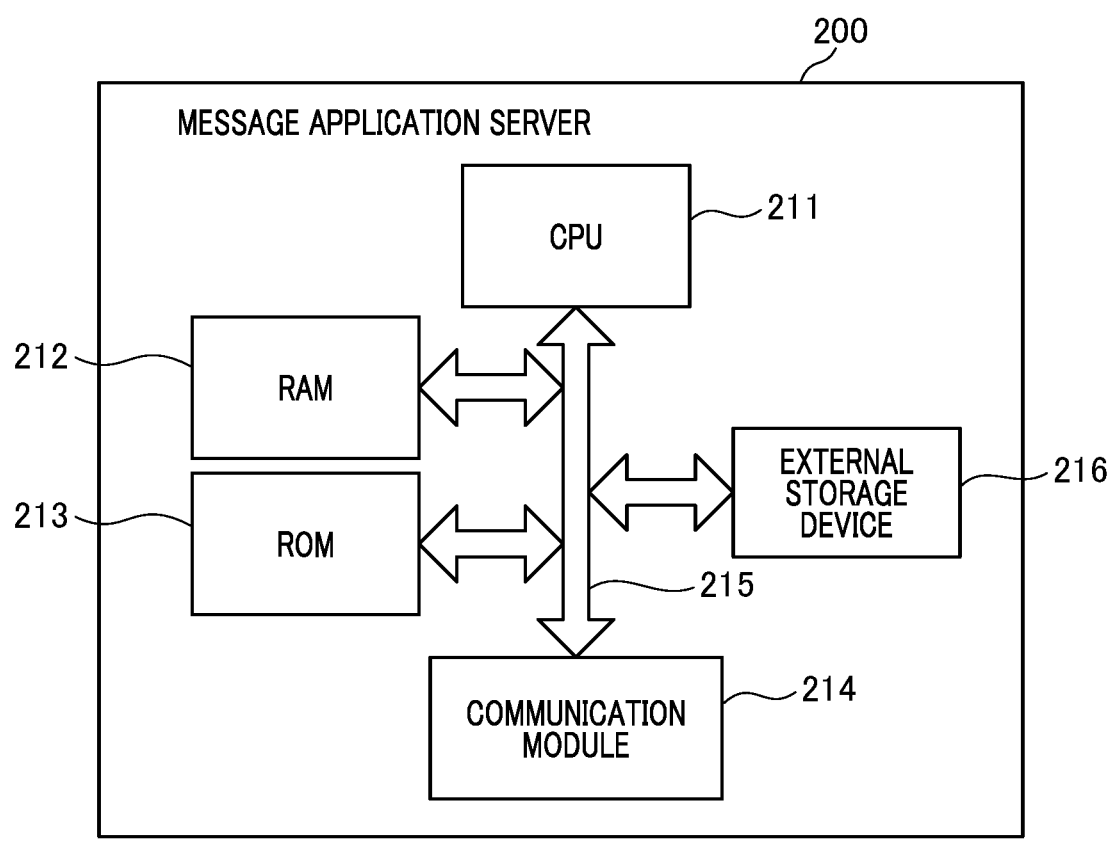
FIG. 3 illustrates a configuration example of a message application server.

FIG. 3 illustrates an example of the hardware configuration of the message application server 200. The message application server 200 includes a CPU 211, a RAM 212, a ROM 213, a communication module 214, and an external storage device 216. These components are connected via a system bus 215 so as to exchange data with each other.

The CPU 211 performs various types of calculation processing according to a program stored in the RAM 212 or the ROM 213 and controls the entire message application server 220. The RAM 212 is a volatile storage region, and is used as a temporary storage region when the CPU 211 performs various types of calculation processing. The ROM 213 is a nonvolatile storage region and stores various types of data.

The communication module 214 is an interface for communicating with an external device. The communication module 214 performs data communication with the client terminal 100 via the network 2000, and performs data communication with the Bot application server 300 via the network 2200. The data communication may be performed by wireless communication, communication via wired lines such as a telephone line and a LAN, or a combination thereof.

The external storage device 216 is a nonvolatile storage region and is used for storing, for example, an operating system and the message service application 201. The system bus 215 exchanges data between the components included in the message application server 200.

Except for the points below, the hardware configuration of the Bot application server 300 is similar to that of the above-described message application server 200. In the Bot application server 300, the Bot application 301 is stored in an external storage device. The communication module of the Bot application server 300 performs data communication with the message application server 200 via the network 2200, and performs data communication with the image processing apparatus 400 via the network 2200. Hence, the description about the hardware configuration of the Bot application server 300 will be omitted. The configurations of the message application server 200 and the Bot application server 300 are not limited to the above, and may be, for example, the same as that of a general information processing apparatus, or different from each other.

Figure 4:
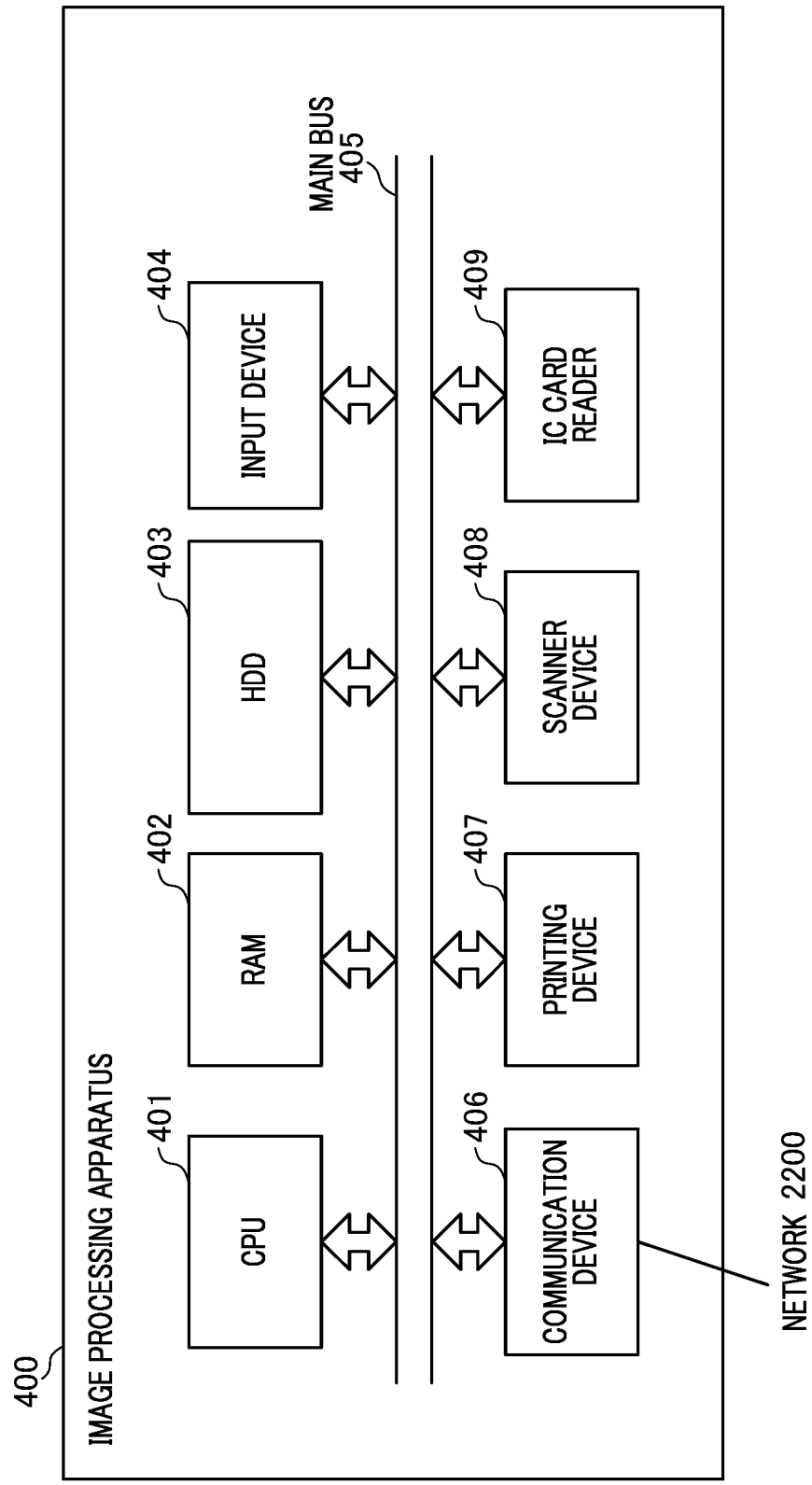
FIG. 4 illustrates a configuration example of an image processing apparatus.

FIG. 4 illustrate an example of the hardware configuration of the image processing apparatus 400. The image processing apparatus 400 includes a CPU 401, a RAM 402, a hard disk (hereinafter, also referred to as an "HDD") 403, an input device 404, a communication device 406, a printing device 407, a scanner device 408, and an IC card reader 409. These components are connected via a main bus 405, and exchange data with each other.

The CPU 401 performs various types of calculation processing according to a program stored in the RAM 402 or the HDD 403, and controls the entire image processing apparatus 400. The RAM 402 is a volatile storage region, and is used as a temporary storage region when the CPU 401 performs various types of calculation processing. The HDD 403 is a storage medium that stores a program executed by the image processing apparatus 400. Instead of the HDD 403, a nonvolatile random access memory (NVRAM) may be used.

The input device 404 is provided with a display unit that provides a GUI to the user and receives various inputs of the user through the GUI. The communication device 406 controls communication with the Bot application server 300 via the network 2200.

The printing device 407 executes printing processing. For example, the printing device 407 converts the image data into a printable data format based on the received print job, and prints and outputs the converted data on a paper document. The printing device 407 outputs the original that has been read by the scanner device 408 to a paper. The scanner device 408 optically reads the original and generates an electronic file (scan data) based on scanning.

The IC card reader 409 is a device for reading the information on the IC card. The card information that can be read includes a number that uniquely identifies the IC card written on the IC chip (hereinafter, referred to as the "IC card identification number"). The main bus 405 exchanges data between the components included in the image processing apparatus 400.

First Embodiment

As the first embodiment, print processing from the message application 101 by using the IC card will be described. In the print processing from the message application 101 by using the IC card, the IC card and the image processing apparatus 400 are registered in advance in association with each other in the Bot application 301. Subsequently, when the user performs a print instruction from the message application 101, the reading of the IC card is requested from the Bot application 301, and when the card information is returned in response to the request, the print processing is executed on the image processing apparatus 400 associated with the IC card. Accordingly, as pre-processing for the print processing by using the IC card in the message application 101, a process for associating and registering the IC card and the image processing apparatus in the Bot application 301 is required.

(Registration Processing for the IC Card and Image Processing Apparatus 400 in Association with Each Other Before Printing)

Figure 5A:
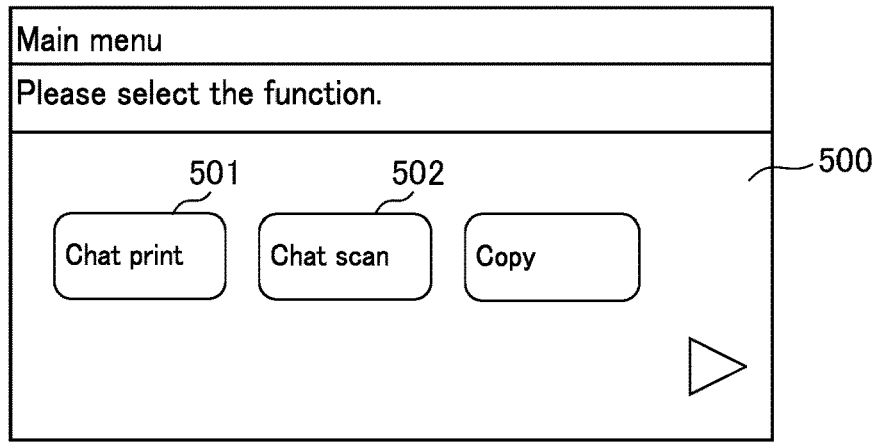
FIGS. 5A to 5C illustrate an example of a screen of the image processing apparatus during association and registration of an IC card and the image processing apparatus.
Figure 5B:
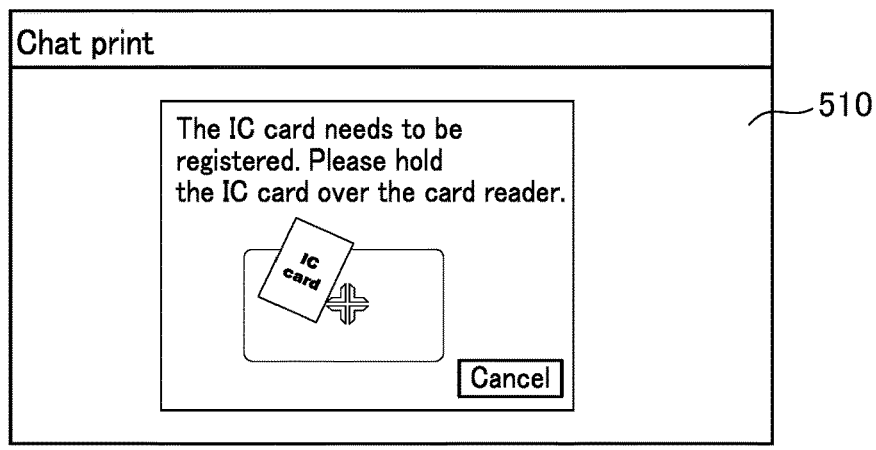
Figure 5C:
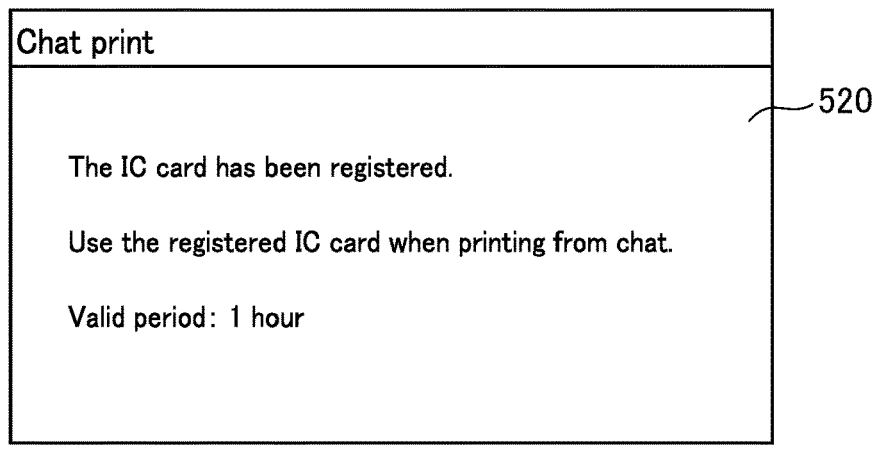
Figure 6:
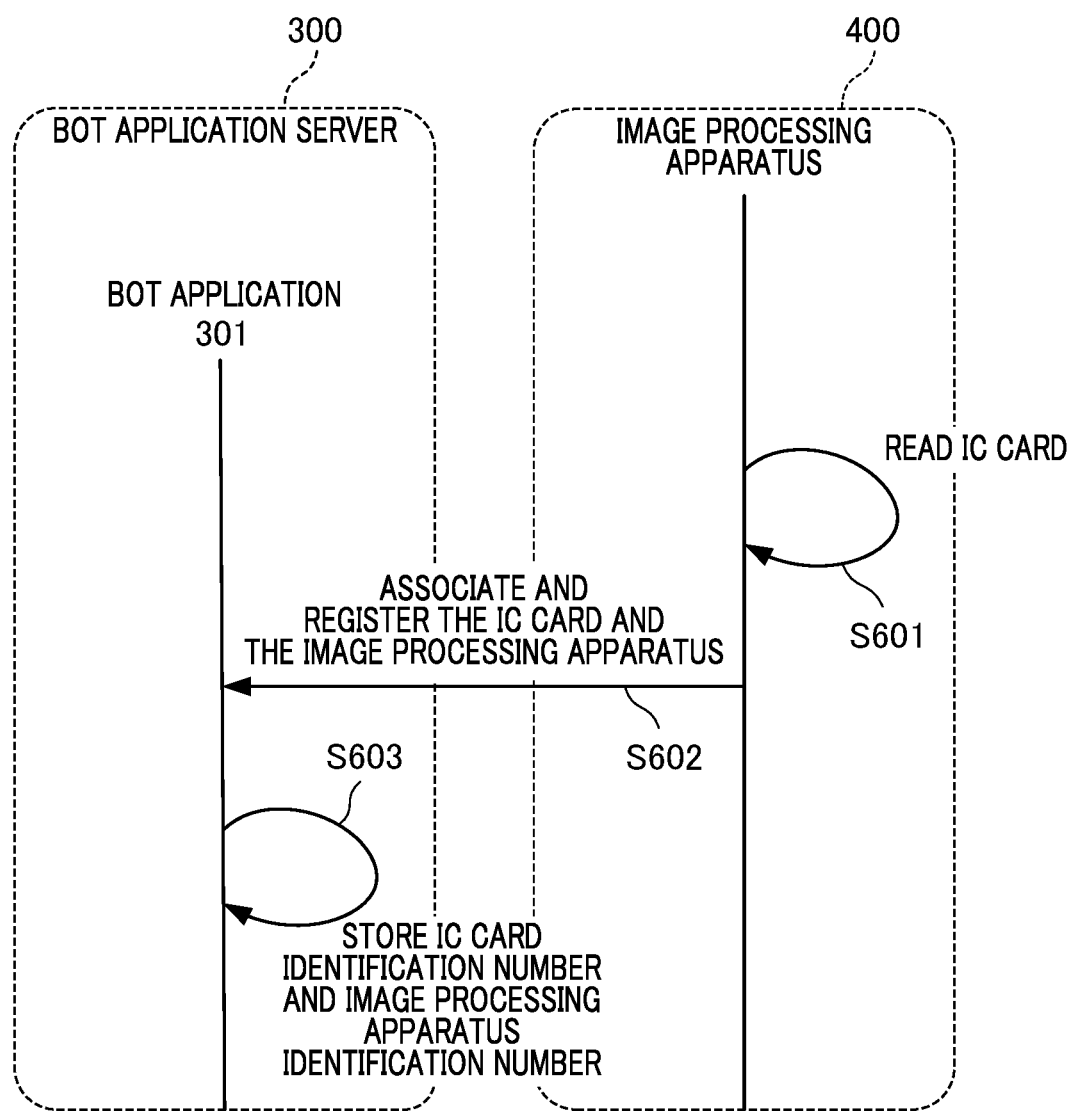
FIG. 6 is a sequence diagram illustrating the process for associating and registering the IC card and the image processing apparatus.

First, referring to FIG. 5 to FIG. 8, the association and registration processing for the IC card and the image processing apparatus 400 will be described. FIGS. 5A to 5C illustrate examples of the screen of the image processing apparatus during the association and registration of the IC card and the image processing apparatus 400. FIG. 6 is a sequence diagram illustrating the association and registration processing for the IC card and the image processing apparatus 400. FIG. 7 illustrates an example of a management table showing the association between the IC card and the image processing apparatus 400.

In order to register the IC card and the image processing apparatus 400 in association with each other, the user first operates the image processing apparatus 400 to register the IC card. FIG. 5A illustrates an example of a main menu screen of the image processing apparatus 400. A main menu screen 500 displays a function menu of the image processing apparatus 400 including a chat print 501 and a chat scan 502. The chat print 501 is an icon corresponding to a print service from the message application. The chat scan 502 is an icon corresponding to a scanning service via the message application.

The user presses the chat print 501 on the main menu screen 500 of the image processing apparatus 400. When the image processing apparatus 400 detects the pressing of the chat print 501, it displays an IC card registration screen 510 for chat print. FIG. 5B illustrates an IC card registration screen 510 for chat print. A display prompting the user to register the IC card and a cancel button are displayed on the IC card registration screen 510 for chat print. The user holds the IC card over the IC card reader 409 of the image processing apparatus 400 according to the display of the IC card registration screen 510 for chat print. For example, the user holds the client terminal 100 having the built-in IC chip 120 serving as an IC card over the IC card reader 409.

In this context, a process from reading the IC card identification number of the client terminal 100 held over the IC card reader 409 to associating and registering the IC card and the image processing apparatus 400 in the Bot application 301 will be described with reference to FIG. 6. In step S601, the image processing apparatus 400 reads the IC card identification number from the built-in IC chip 120 of the client terminal 100 being held over the IC card reader 409.

In step S602, the image processing apparatus 400 requests the Bot application 301 to associate and register the IC card and the image processing apparatus 400. At this time, the image processing apparatus 400 transmits the image processing apparatus identification number of its own apparatus and the IC card identification number read in step S601 to the Bot application 301. The image processing apparatus identification number is identification information for uniquely identifying the image processing apparatus 400.

In step S603, the Bot application 301 holds the image processing apparatus identification number and the IC card identification number received from the image processing apparatus 400 in association with each other. The Bot application 301 manages the image processing apparatus identification number and the IC card identification number in association with each other by using, for example, the management table 700 shown in FIG. 7.

The management table 700 manages the image processing apparatus and the IC card in association with each other. In the present embodiment, the valid period for the information about the association between the image processing apparatus and the IC card is also managed by the management table 700. The management table 700 includes an IC card identification number column 701, an image processing apparatus identification number column 702, and a valid period column 703. In the IC card identification number column 701, the IC card identification number that has been acquired from the image processing apparatus 400 and read in step S601 is stored. In the image processing apparatus identification number column 702, the image processing apparatus identification number that has been acquired from the image processing apparatus 400, in which the reading of the IC card identification number has been performed, is stored. In the valid period column 703, a value, which takes into consideration a predetermined time determined in advance, is registered during the addition of a row to the management table 700. Specifically, in the valid period column 703, the valid period for a predetermined time in which the registration of the IC card and the image processing apparatus 400 in association with each other is effective, based on the date and time of the registration, is stored.

When the valid period shown in the valid period column 703 ends, the corresponding row is deleted from the management table 700.

When the association and registration of the image processing apparatus and the IC card is completed, the Bot application 301 transmits the valid period for the association between the image processing apparatus and the IC card to the image processing apparatus 400. The image processing apparatus 400 displays, on a registration completion screen 520 shown in FIG. 5C, that the association and registration of the IC card and the image processing apparatus 400 have been completed, displays the valid period information, and provides notification about them to the user. The valid period displayed on the registration completion screen 520 may be a date and time or a time-period.

By the above processes, it is possible to associate and register the identification number of the image processing apparatus 400 in which the print processing is to be performed and the identification number of the IC card in the Bot application 301. By the above association and registration processing for the IC card and the image processing apparatus 400, the preparation for the chat print is completed, and printing can be executed by performing a posting to the message application 101.

(Execution of Printing)

Figure 8:
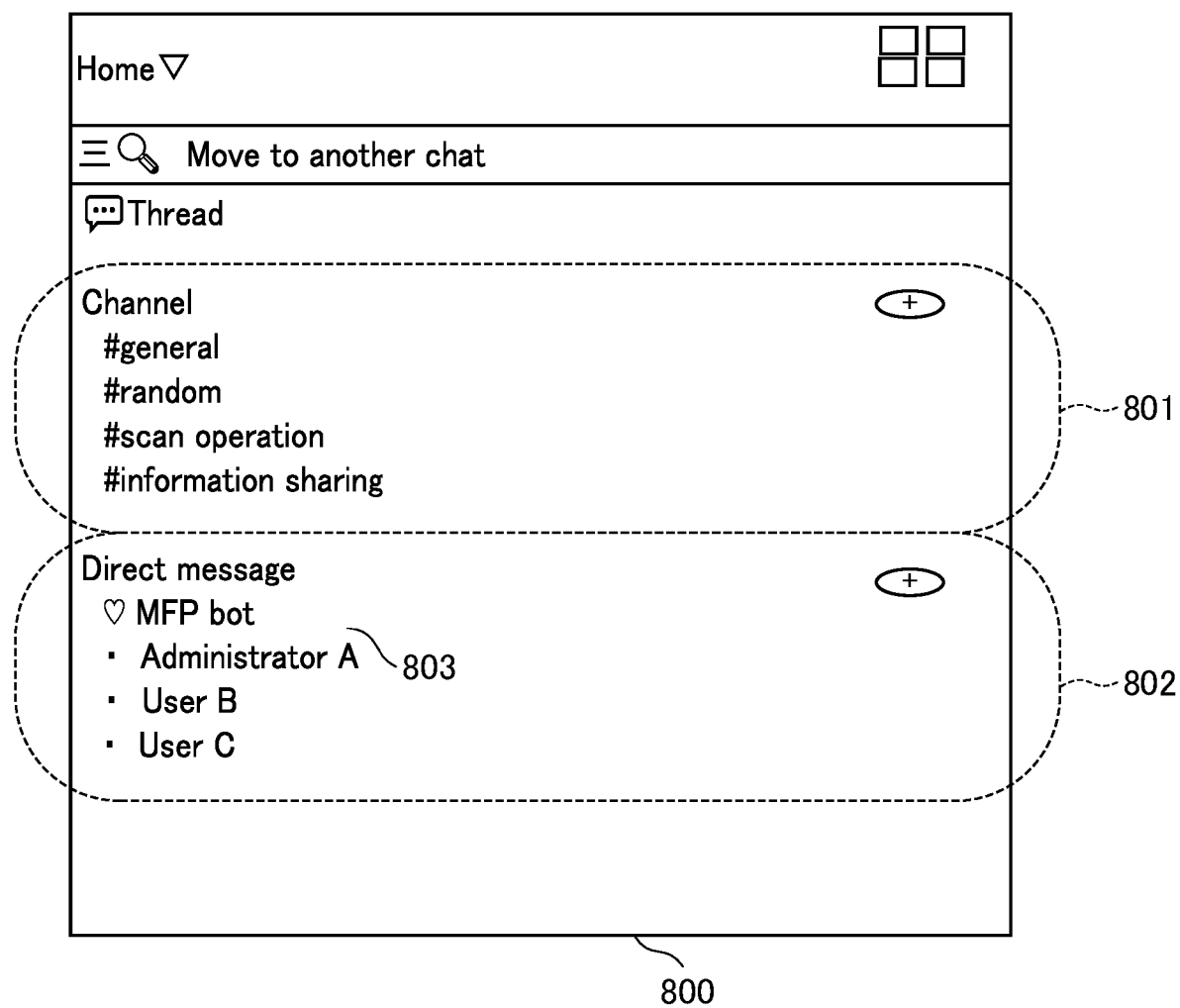
FIG. 8 illustrates an example of a home screen of a message application.
Figure 9:
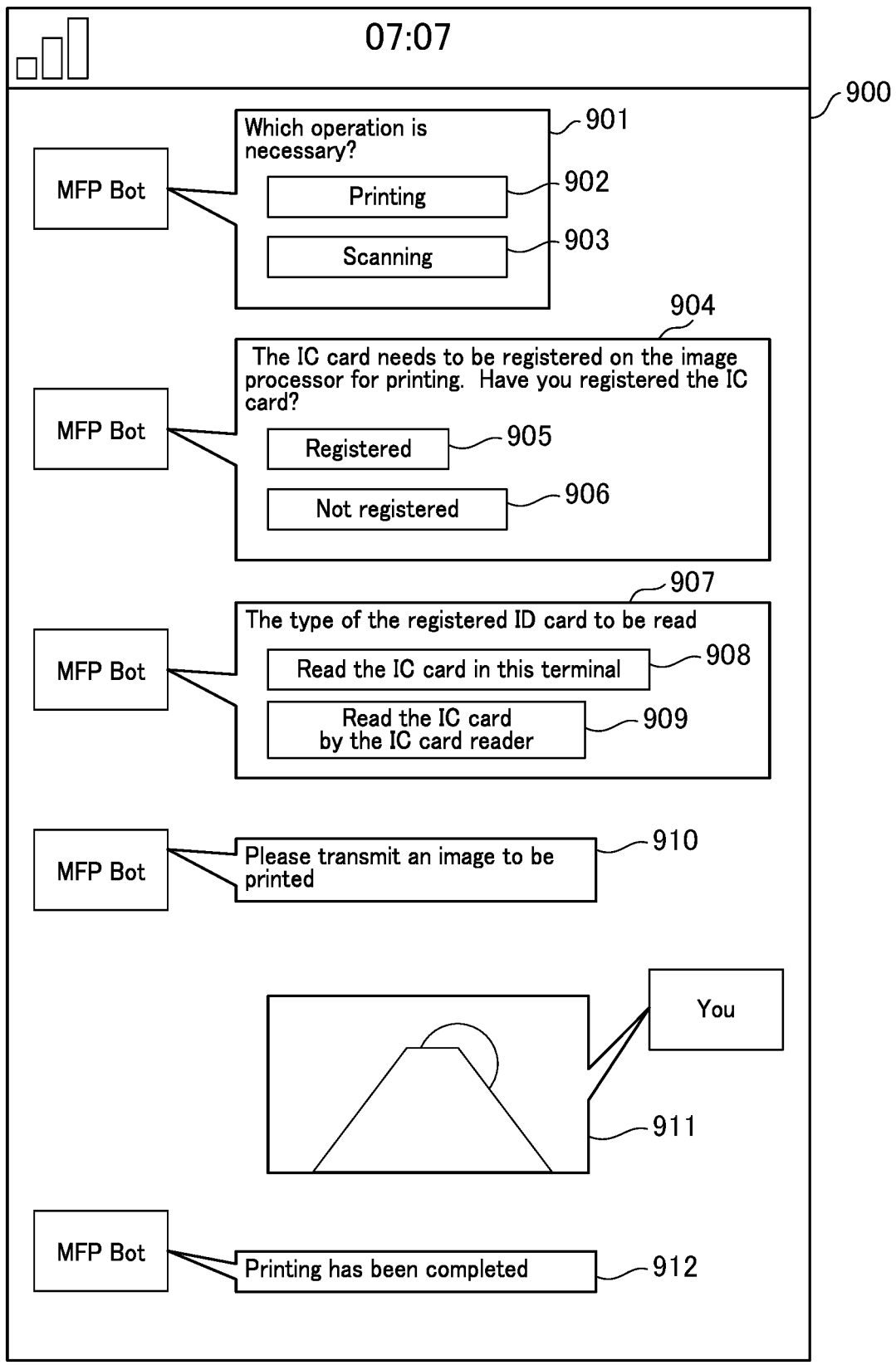
FIG. 9 illustrates an example of a message exchange screen with an MFP bot during execution of printing.
Figure 10:
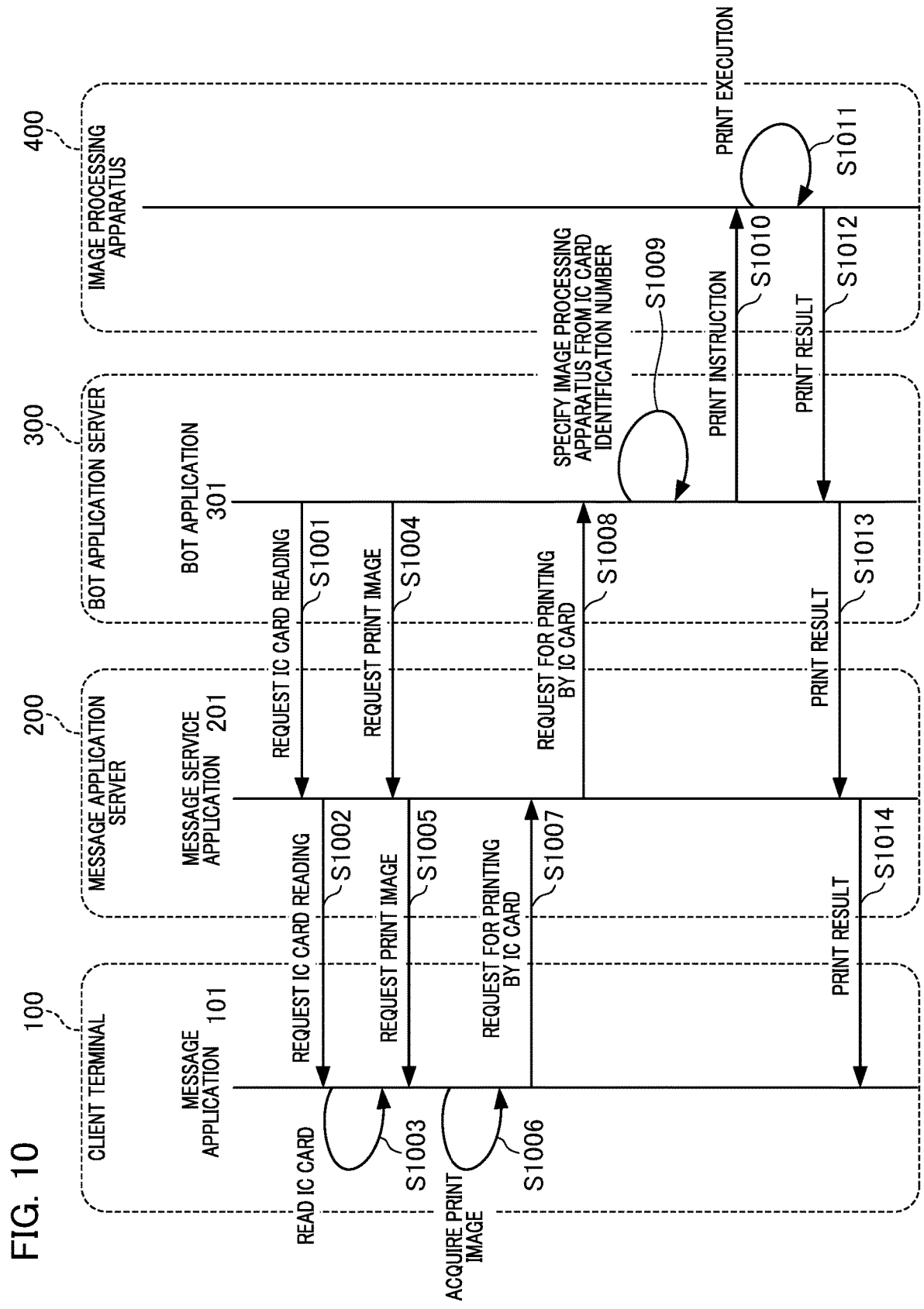
FIG. 10 is a sequence diagram illustrating a process during execution of printing.

Next, a process for executing printing from the message application will be described with reference to FIG. 8 to FIG. 10. FIG. 8 illustrates an example of a home screen 800 of the message application 101, FIG. 9 illustrates an example of the message exchange screen during print processing by using the message application 101. FIG. 10 is a sequence diagram illustrating the print processing.

The home screen 800 of the message application 101 includes a channel list display part 801 and a user list display part 802. The channel list display part 801 displays, among channels sharing messages with another user, a list of channels to which an operating user belongs. The channel is an example of a communication space used in a chat function for sharing messages by a plurality of user accounts in the message sharing system. Examples of such communication spaces include Slack channels, Chatwork group chats, and LINE group talks. The user list display part 802 displays a list of users who can directly exchange messages.

In the user list display part 802 shown in FIG. 8, a Bot account (MFP Bot 803) is displayed as a user who can directly exchange messages. The Bot account (MFP Bot 803) is a virtual user registered in the message sharing system, and a response is performed by the Bot application 301. In the message application 101, the user can select the MFP Bot 803 as a user who can directly exchange messages.

FIG. 9 illustrates an example of a message exchange screen 900 with the MFP Bot in the message application 101. The message exchange screen 900 of FIG. 9 is displayed on the display device 114 of the client terminal 100 in accordance with an operation of selecting the "MFP Bot 803" serving as a virtual user from the user list display part 802 of the home screen 800 of FIG. 8. On the message exchange screen 900, the Bot application 301 displays a message as an "MFP Bot", and the user displays the message as "You".

When the message exchange screen 900 with the MFP Bot is displayed, the message application 101 first displays an MFP Bot message 901. The MFP Bot message 901 displays a message for allowing the user to select a process to be executed by the MFP (image processing apparatus 400). For example, the MFP Bot message 901 includes a print instruction button 902 for providing instructions for printing, a scan instruction button 903 for providing instructions for scanning, and a message prompting the user to select whether to perform printing or scanning.

The process of displaying the MFP Bot message 901 will be described in detail. When the message exchange screen 900 is displayed, the Bot application 301 transmits an instruction request to the message service application 201. When receiving the request of the instruction request message, the message service application 201 transmits the MFP Bot message 901 as an instruction request from the Bot account to the user account of the message application 101.

When the user selects the print instruction button 902 providing instructions for printing, the message application 101 displays an MFP Bot message 904. The MFP Bot message 904 is a message for confirming, with the user, whether or not the association and registration of the IC card and the image processing apparatus 400 have been performed. For example, the MFP Bot message 904 includes a message confirming whether or not the IC card and the image processing apparatus 400 have been registered in association with each other, a "registered" button 905 indicating that the IC card and the image processing apparatus 400 have been registered, and a "not-registered" button 906 indicating that the IC card and the image processing apparatus 400 have not been registered yet.

When the user selects the registration button 905 indicating that an IC card and the image processing apparatus 400 have been registered in association with each other, the message application 101 displays an MFP Bot message 907. The MFP Bot message 907 is a message for prompting the user to read the IC card. For example, a message for prompting the reading of the IC card, a terminal button 908 for selecting a terminal in use as an object of reading the IC card identification number, and an IC card button 909 for selecting the IC card of the terminal that is other than the terminal in use is displayed on the MFP Bot message 907.

The process of displaying the MFP Bot message 907 corresponds to the processes of steps S1001 and S1002 in FIG. 10. Specifically, in step S1001, the Bot application 301 transmits a request for reading the IC card to the message service application 201. Subsequently, in step S1002, the message service application 201 transmits a request for reading the IC card to the message application 101, and displays the MFP Bot message 907 on the message exchange screen 900.

When the user selects the terminal button 908, the message application 101 acquires the IC card identification number from the built-in IC chip 120 of the client terminal 100. In contrast, when the user selects the IC card button 909, the message application 101 acquires the IC card identification number via the IC card reader 119 of the client terminal 100. The process of reading the card information to obtain the IC card identification number corresponds to the process of step S1003 in FIG. 10. In the present embodiment, it is assumed that the user selects the terminal button 908 for selecting a terminal in use as an object of reading the IC card identification number, and the message application 101 acquires the IC card identification number from the built-in IC chip 120 of the client terminal 100.

Next, the message application 101 displays an MFP Bot message 910. The MFP Bot message 910 prompts the user to transmit an image (original) to be printed. The user selects an image to be printed according to the MFP Bot message 910, and posts it on the message exchange screen 900. The process of displaying the MFP Bot message 910 corresponds to the processes of steps S1004 and S1005 in FIG. 10. Specifically, in step S1004, the Bot application 301 transmits a request for providing an image to be printed to the message service application 201. Subsequently, in step S1005, the message service application 201 transmits a request for providing an image to be printed to the message application 101, and the MFP Bot message 910 is displayed on the message exchange screen 900. Note that steps S1004 and S1005 for requesting an image to be printed may be transmitted simultaneously with steps S1001 and S1002 that request the card information. The process in which the message application 101 acquires the image to be printed that has been posted by the user corresponds to the process in step S1006 of FIG. 10.

The message application 101 provides a notification about the acquired image to be printed and the IC card identification number acquired in step S1003 to the Bot application 301 via the message service application 201. The process in which the message application 101 provides the notification about the image to be printed and the IC card identification number to the message service application 201 corresponds to the print request processing by the IC card in step S1007 of FIG. 10. The process in which the message service application 201 provides the notification about the image to be printed and the IC card identification number to the Bot application 301 corresponds to the print request processing by the IC card in step S1008 of FIG. 10.

The Bot application 301 that has acquired the image to be printed and the IC card identification number specifies an image processing apparatus identification number corresponding to the IC card identification number by referring to the management table 700. The process in which the Bot application 301 specifies the image processing apparatus identification number from the IC card identification number acquired from the message application 101 corresponds to the process in step S1009 in FIG. 10.

The Bot application 301 inputs a print job for instructing the image processing apparatus 400 having the image processing apparatus identification number that has been specified in step 1009 to print the image that has been acquired from the message application 101. The process in which the Bot application 301 instructs the image processing apparatus 400 corresponding to the image processing apparatus identification number to print the image posted on the message exchange screen 900 corresponds to the process of step S1010 in FIG. 10.

The image processing apparatus 400 that has received the print job from the Bot application 301 executes print processing according to the print job. The process in which the image processing apparatus 400 executes printing corresponds to the process of step S1011 in FIG. 10. The image processing apparatus 400 provides a notification about the print result to the Bot application 301 after printing has been executed. The process in which the image processing apparatus 400 provides the notification about the print result to the Bot application 301 corresponds to the process of step S1012 in FIG. 10.

The Bot application 301 that has received the notification about the print result from the image processor 400 provides the notification about the print result to the message application 101 via the message service application 201. Subsequently, the message application 101 displays an MFP Bot message 912 indicating that printing has been completed. The process in which the Bot application 301 provides the notification about the print result to the message service application 201 corresponds to the process of step S1013 in FIG. 10. The process in which the message service application 201 provides the notification about the print result to the message application 101 and displays the print result to serve as the MFP Bot message 912 corresponds to the process of step S1014 in FIG. 10.

Thus, the user can execute printing by the predetermined image processing apparatus 400 from the message application 101 on the client terminal 100. At that time, the only operation required is reading the IC card on the message application 101, and as a result, the time and effort for inputting numbers such as an ID is eliminated.

Second Embodiment

As the second embodiment, the scan processing from the message application 101 by using the IC card will be described. In the scan processing from the message application 101 by using the IC card, the IC card and a destination (for example, a message to a user account, and a communication space) of a scan image (scan data) specified by the user are associated and registered in advance in the Bot application 301. When the user scans the image by using the image processor 400 by using the IC card, the Bot application 301 transmits the scanned image to a destination corresponding to the IC card. Accordingly, as the prior processing for the scan processing performed by using the IC card in the message application 101, the process for associating and registering the IC card and the destination in the Bot application 301 is required.

(Association and Registration Processing for IC Card and Destination Before Scanning)

Figure 11:
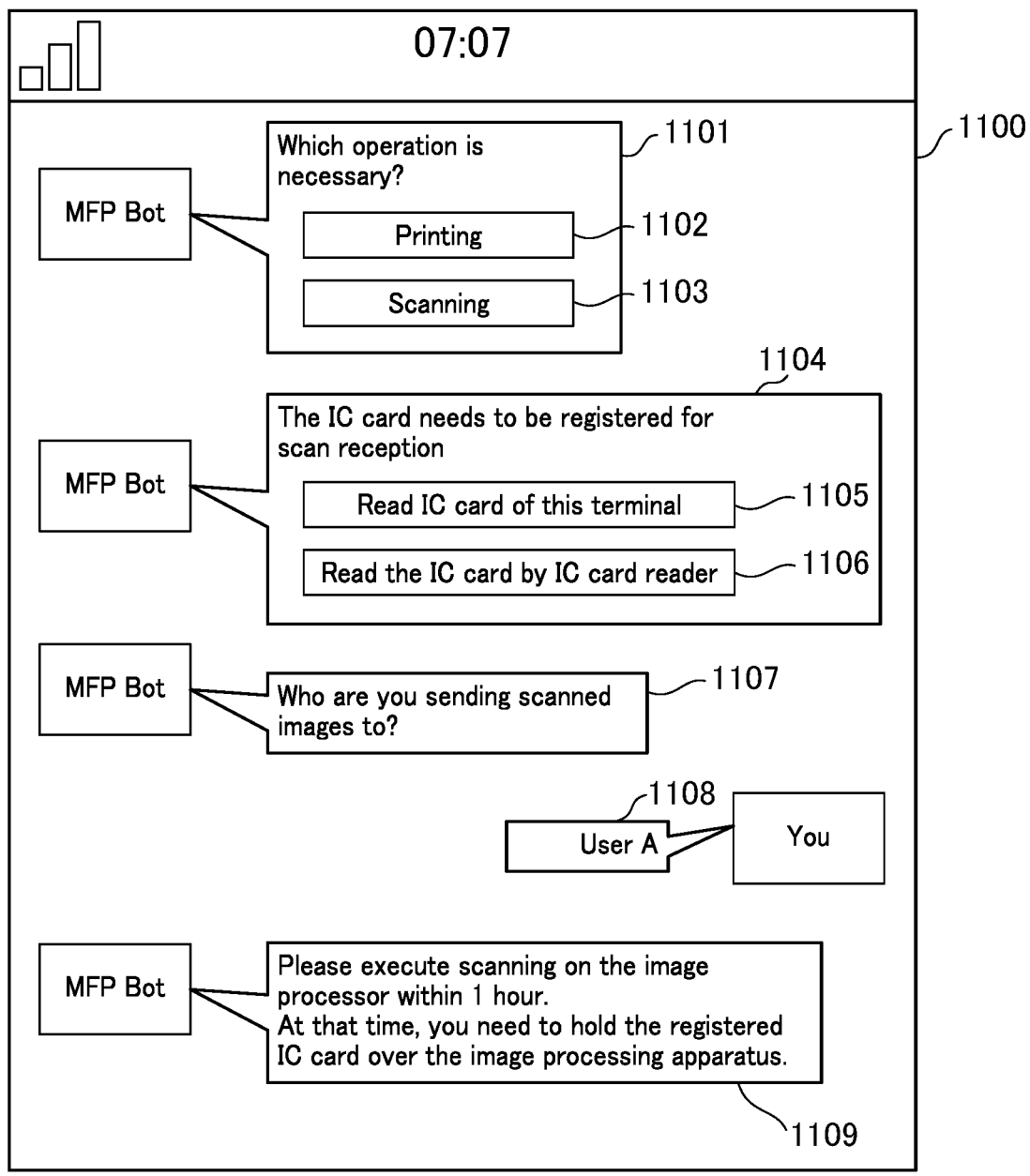
FIG. 11 illustrates an example of a message exchange screen with the MFP bot during association and registration of the IC card and a destination of a scanned image.
Figure 12:
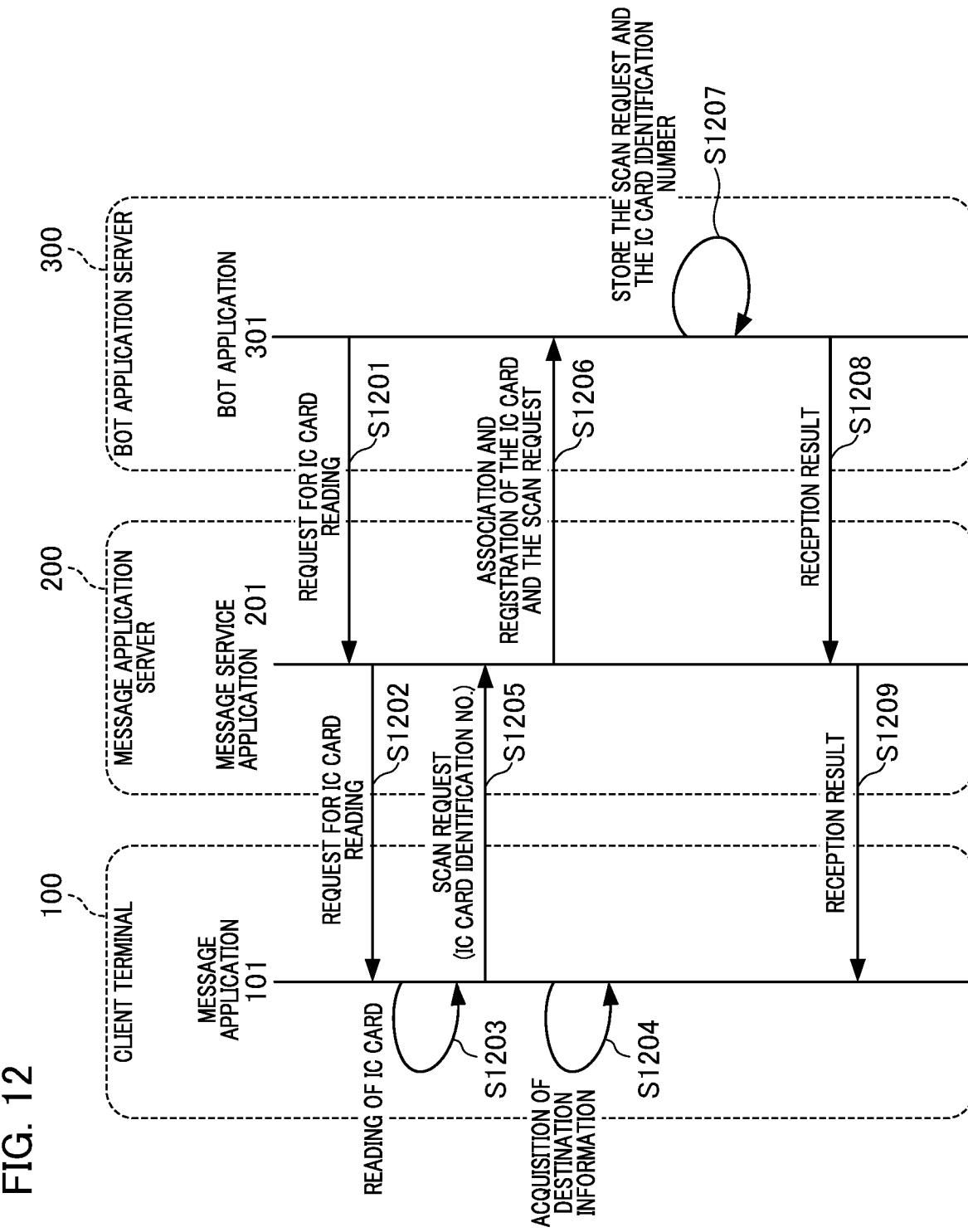
FIG. 12 is a sequence diagram illustrating the process for associating and registering the IC card and the destination of the scanned image.
Figure 14A:
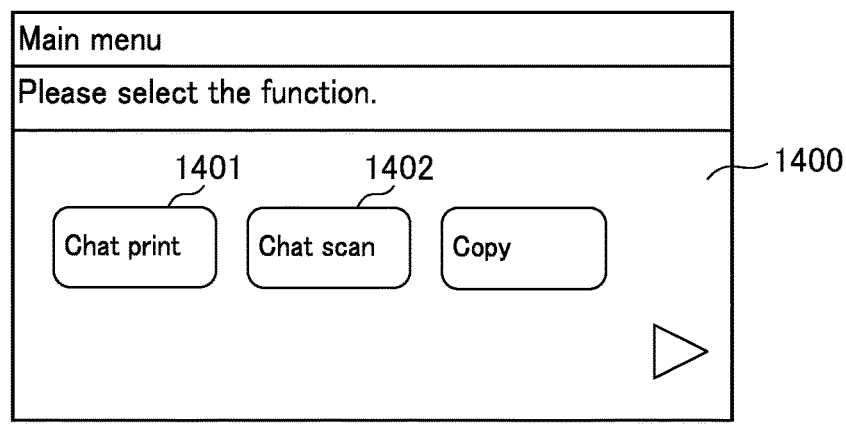
FIGS. 14A to 14D illustrate an example of the screen of the image processing apparatus during the execution of scanning.
Figure 14B:
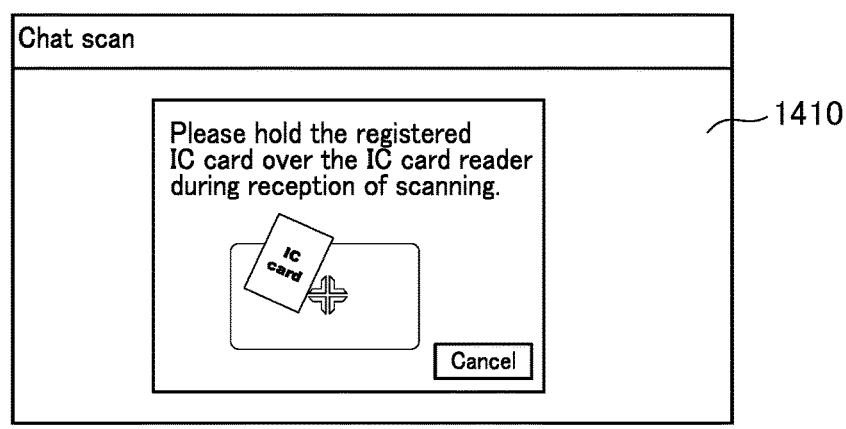
Figure 14C:
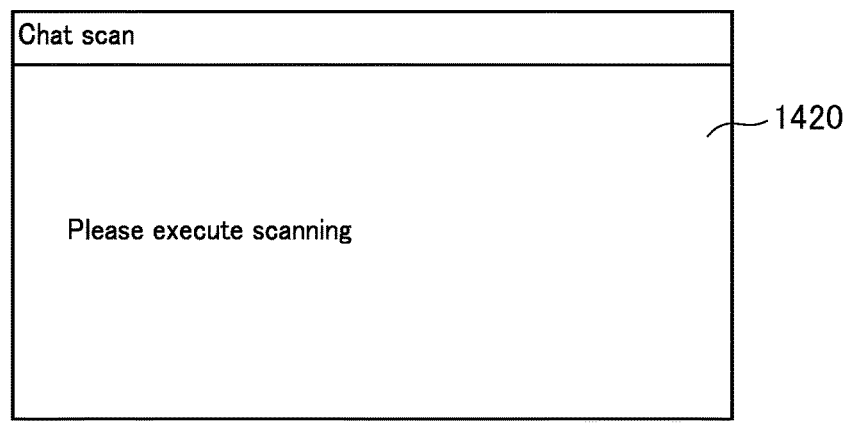
Figure 14D:
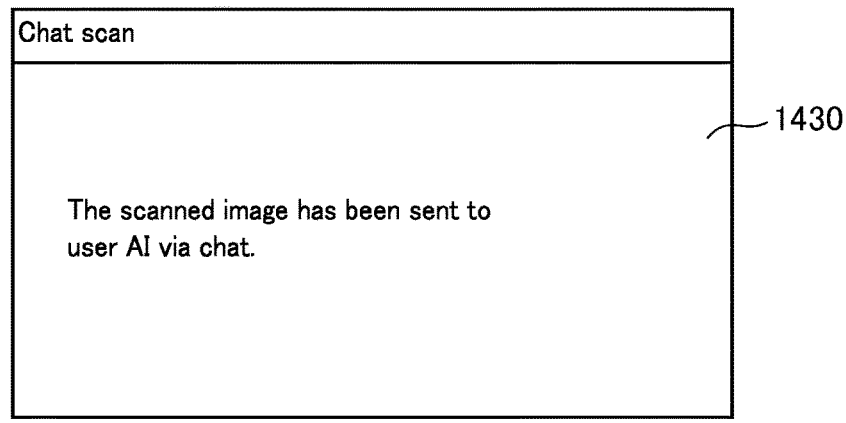

First, referring to FIG. 11 to FIG. 13, a description will be given of the association and registration processing for the IC card and the destination of the scanned image in the Bot application 301. FIG. 11 illustrates an example of the message exchange screen during scan processing performed by using the message application 101. FIG. 12 is a sequence diagram illustrating the association and registration processing for the IC card and the destination of the scanned image. FIG. 13 illustrates an example of the management table showing the association of the IC card and the destination of the scanned image.

A message exchange screen 1100 shown in FIG. 11 is a screen that is displayed on the display device 114 of the client terminal 100 by the message application 101. The message exchange screen 1100 of FIG. 11 is displayed on the display device 114 of the client terminal 100 in accordance with the operation of selecting the "multifunction device bot 803" that is a virtual user from the user list display part 802 of the home screen 800 in FIG. 8. On the message exchange screen 900, the Bot application 301 displays a message as an MFP Bot.

When the message exchange screen 1100 with the MFP bot is displayed, the message application 101 first displays an MFP Bot message 1101. The MFP Bot message 1101 is a message similar to the MFP bot message 901 shown in FIG. 9. When the user selects a scan instruction button 1103 for instructing scanning and requests scanning, the message application 101 displays an MFP Bot message 1104.

The MFP Bot message 1104 is a message for prompting the user to read the IC card. For example, a message indicating that an IC card needs to be registered, a terminal button 1105, and an IC card button 1106 are displayed on the MFP Bot message 907. The terminal button 1105 is an icon for selecting a terminal that is in use as an object having the IC card identification number that is read. The IC card button 1106 is an icon for selecting an IC card that is other than the terminal in use, as an object having the IC card identification number that is read.

When the user selects the terminal button 1105, the message application 101 acquires the IC card identification number from the built-in IC chip 120 of the client terminal 100. In contrast, when the user selects the IC card button 1106, the message application 101 acquires the IC card identification number via the IC card reader 119 of the client terminal 100. In the present embodiment, it is assumed that the user selects the terminal button 1105 for selecting a terminal in use as an object of which the IC card identification number is read, and the message application 101 acquires the IC card identification number from the built-in IC chip 120 of the client terminal 100.

Upon acquiring the IC card identification number, the message application 101 displays an MFP Bot message 1107. The MFP Bot message 1107 prompts the user to input a destination (for example, a message to a user account, and a communication space) of the scanned image (scan data). The user inputs the destination of the scanned image according to the MFP Bot message 1107. The destination of the scanned image may be an individual user (user account) who uses a message service, or a group (communication space). Additionally, a plurality of destinations may be specified at one time. When the user inputs the destination of the scanned image, the message application 101 displays a user message 1108.

The process of acquiring the card information necessary for scanning and the destination of the scan data from the scanning request source in response to the scanning request corresponds to the processes of steps S1201 to S1206 in FIG. 12. Specifically, in step S1201, the Bot application 301 transmits a request for reading the IC card and a request for inputting the destination to the message service application 201. Subsequently, in step S1202, the message service application 201 that has received the requests transmits a request for reading the IC card and a request for inputting the destination to the message application 101.

Based on the requests from the Bot application 301, the message application 101 first displays the MFP Bot message 1104 for prompting the reading of the IC card on the message exchange screen 1100. In step S1203, the message application 101 reads the card information and acquires the IC card identification number according to the method for reading the IC card identification number selected by the user.

Next, the message application 101 causes the message exchange screen 1100 to display the MFP Bot message 1107 for prompting the input of the destination (address) of the scanned image based on the request from the Bot application 301. In step 1204, the message application 101 acquires the destination that has been input by the user. The Bot application 301 posts the MFP Bot messages 1104 and 1107 to the message exchange screen 1100 to serve as the MFP Bot in steps 1201 and 1202 in order to request the request source of the scanning request to provide the card information and the destination. Subsequently, the message application 101 acquires the card information and the destination in steps S1203 and S1204, and provides a notification about the scan image transmission reservation including the information to the Bot application 301.

A process in which the message application 101 provides a notification about the scan image transmission reservation to the Bot application 301 corresponds to steps S1205 and S1206 in FIG. 12. The scan image transmission reservation includes the IC card identification number acquired in step S1203 and the destination (for example, a message to a user account, and a communication space) of the scanned image acquired in step S1204. Specifically, in step S1205, the message application 101 provides a notification about the scan image transmission reservation to the message service application 201. Subsequently, in step S1206, the message service application 201 that has received the scan image transmission reservation provides the notification about the scan image transmission reservation to the Bot application 301.

The Bot application 301 that has received the scan image transmission reservation from the message application 101 holds the IC card identification number and the destination of the scanned image included in the scan image transmission reservation in association with each other. The Bot application 301 manages the IC card identification number and the destination of the scanned image in association with each other by using, for example, the management table 1300 shown in FIG. 13.

The management table 1300 manages the IC card identification number and the destination of the scanned image in association with each other. In the present embodiment, the management table 1300 also manages the valid period for the IC card identification number and the destination of the scanned image that are associated with each other. The management table 1300 includes an IC card identification number column 1301, a scanned image destination 1302, and a valid period column 1303. The IC card identification number acquired from the message application 101 and read in step 1203 are stored in the IC card identification number column 1301. The destination of the scanned image acquired from the message application 101 and read in step 1203 is stored in the destination 1302 of the scanned image. A value taking into account a predetermined time, which is determined in advance when a row is added to the management table 1300, is registered in the valid period column 1303.

Specifically, in the valid period column 1303, the expiration date and time for a predetermined time in which the association between the IC card identification number and the destination of the scanned image is effective, based on the registration date and time of the association, is stored. When the valid period described in the valid period column 1303 arrives, the corresponding row is deleted from the management table 1300. In the Bot application 301, the process for associating and registering the IC card identification number and the destination of the scanned image corresponds to the process of step S1207 in FIG. 12.

The Bot application 301 that has registered the IC card identification number and the destination of the scanned image in association with each other based on the scanned image transmission reservation provides a notification about the reception result to the message application 101 via the message service application 201. The message application 101 that has acquired the reception result from the Bot application 301 displays an MFP Bot message 1109 on the message exchange screen 1100. The MFP Bot message 1109 is a message indicating the reception result of the scan image transmission reservation. The MFP Bot message 1109 displays a message prompting the user to execute scanning by holding the registered IC card over the image processing apparatus by, for example, the valid period registered in the management table 1300.

A process in which the Bot application 301 provides a notification about the reception result to the message application 101 via the message service application 201 corresponds to steps S1208 and S1209 in FIG. 12. Specifically, in step S1208, the Bot application 301 provides the notification about the reception result to the message service application 201. Subsequently, in step S1209, the message service application 201 that has received the reception result provides the notification about the reception result to the message application 101 to display the reception result to serve as the MFP Bot message 1109.

By the above processes, the IC card identification number to be read when the image processing apparatus 400 performs scanning and the destination (address) to which the scanned image generated by the scanning is to be transmitted can be registered in association with each other in the Bot application 301. Preparation for chat scanning is completed by the process for associating and registering the IC card and the destination of the scanned image.

(Execution of Scanning)

Figure 15:
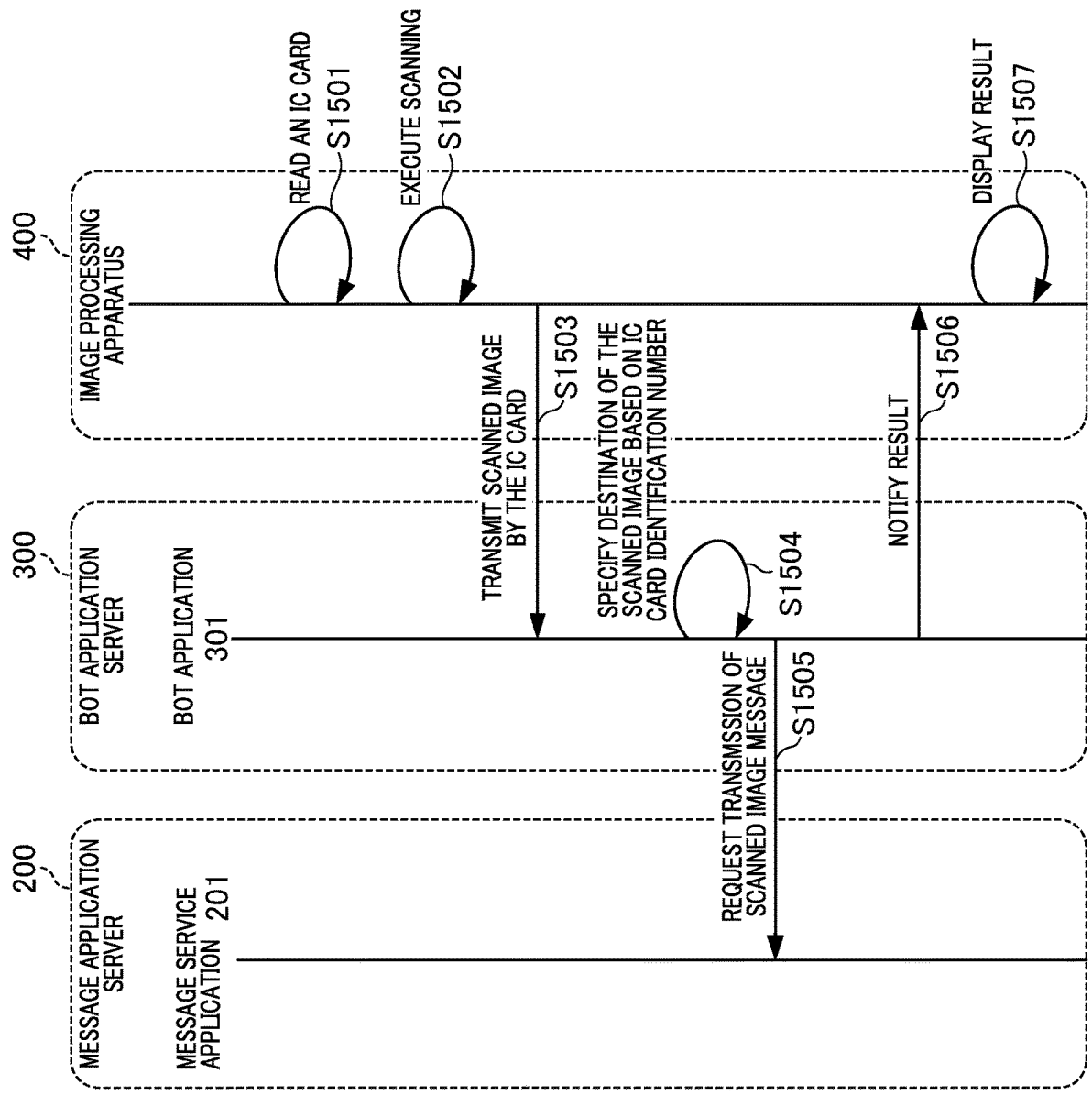
FIG. 15 is a sequence diagram illustrating a process during execution of scanning.

Next, with reference to FIGS. 14 and 15, the scan processing after the IC card identification number and the destination of the scanned image have been associated in the Bot application 301 will be described. FIGS. 14A to 14D illustrate examples of the screen of the image processing apparatus 400 when the scan processing is executed. FIG. 15 is a sequence diagram illustrating the scan processing.

FIG. 14 illustrates an example of the main menu screen of the image processing apparatus 400. A main menu screen 1400 is similar to the main menu screen 500 of FIG. 5A. The main menu screen 1400 is displayed on a display unit provided in the input device 404 of the image processing apparatus 400. The main menu screen 1400 displays a function menu of the image processing apparatus 400 that includes a chat print 1401 and a chat scan 1402. The chat print 1401 is an icon corresponding to a print service from the message application. The chat scan 1402 is an icon corresponding to a scanning service via the message application.

The user presses the chat scan 1402 on the main menu screen 1400 of the image processing apparatus 400. When the image processing apparatus 400 detects the pressing of the chat scan 1402, it displays a chat scan IC card reading screen 1410 shown in FIG. 14B. The chat scan IC card reading screen 1410 is displayed on the display part of the input device 404. When a scanning request is performed in the message application 101, the chat scan IC card reading screen 1410 displays a display for prompting the user to hold the registered IC card over the IC card reader 409 and a cancel button. The user holds the IC card over the IC card reader 409 of the image processing apparatus 400 according to the display of the chat scan IC card reading screen 1410. For example, the user holds the client terminal 100 having the built-in IC chip 120 as an IC card over the IC card reader 409.

A process of reading the IC card identification number of the client terminal 100, which is held over the IC card reader 409, and transmitting the scanned image will be described with reference to FIG. 15. In step S1501, the image processing apparatus 400 reads the IC card identification number from the built-in IC chip 120 of the client terminal 100, which is held over the IC card reader 409.

In step S1502, the image processing apparatus 400 executes scanning. Specifically, the image processing apparatus 400 displays a scan execution screen 1420 shown in FIG. 14C. The scan execution screen 1420 is displayed on a display unit provided in the input device 404. On the scan execution screen 1420, for example, a message prompting the user to execute scanning is displayed. The user sets an original to be scanned on the scanner device 408 and instructs the image processing apparatus 400 to execute scanning. The image processing apparatus 400 executes scanning according to the scanning instruction from the user, and generates a scanned image of the scanned document.

In step S1303, the image processing apparatus 400 provides a notification about the IC card identification number that was read in step 1301 and the scanned image that was generated in step S1302 to the Bot application 301. In step S1304, the Bot application 301 refers to the management table 1300 and specifies the destination of the scanned image corresponding to the IC card identification number that has been acquired from the image processing apparatus 400.

In step 1405, the Bot application 301 requests the message application 101 to transmit the scanned image as a message to the destination of the scanned image that has been specified in step S1304. The message application 101 that has received the request for transmitting the scanned image transmits the scanned image to the message application 101 of the destination of the specified scanned image.

In step 1406, the Bot application 301 provides a notification about the transmission result for the scanned image to the message application 101 in step 1405 to the image processing apparatus 400. In step 1407, the image processing apparatus 400 displays the scan transmission result screen 1403 shown in FIG. 14D, and provides a notification about the transmission result of the scanned image to the user. The scan transmission result screen 1403 is displayed on the display unit of the input device 404. The scan transmission result screen 1403 displays the transmission result for the scanned image. The scan transmission result screen 1403 may include information about the destination of the scanned image.

Thus, the user can transmit the scanned image from the image processing apparatus 400 to the destination of the scanned image that has been registered in advance by the message application 101. At that time, in the image processing apparatus 400, the only operation that is required is reading the IC card on the message application 101, and as a result, the time and effort for inputting numbers such as an 1D is eliminated.

As described above, according to the present embodiment, the use of the IC card in the use of the print service or the scanning service via the message application leads to reducing the time and effort required for inputting numbers such as an ID.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-150009, filed Sep. 7, 2020, which is hereby incorporated by reference herein in its entirety.

What is claimed is:

1. A scanning system including an information processing apparatus having a web application cooperating with a message sharing system and an image processing apparatus provided with a scanner, the scanning system comprising:
the information processing apparatus comprising:
a memory storing first instructions related to the web application; and
a processor executing first instructions causing the information processing apparatus to:
transmit a card information request to a scanning request source in response to a scanning request from a user account belonging to the message sharing system;
receive card information from the scanning request source; and
hold, in a management table, the card information and destination information to which scan data generated based on scanning is to be posted in association with each other, wherein the destination information indicates a specification of a communication space of the message sharing system or a specification of a message of the message sharing system,
the image processing apparatus comprising:
a reader;
a scanner;
a memory storing second instructions; and
a processor executing second instructions causing the image processing apparatus to:
receive card information using the reader;
generate scan data using the scanner;
transmit, to the information processing apparatus, the scan data and the card information so that the scan data is posted to the message sharing system,
wherein the first instructions further cause the information processing apparatus to:
receive the scan data and the card information from the image processing apparatus;
specify the destination information a destination having been held in the management table in association with the card information received from the image processing apparatus;
post, by designating the specified destination information, the scan data received from the image processing apparatus to the message sharing system, and
delete the card information and destination information having been held in the management table.

2. The scanning system according to claim 1,
wherein, in response to the scanning request, the information processing apparatus posts a message prompting registration of the card information as the card information request and a message prompting specify of the destination information to the message sharing system via a Bot account registered in the message sharing system.

3. The scanning system according to claim 1,
wherein the association between the card information and the destination information has a valid period, and the information processing apparatus delete the card information and the destination information from the management table when the valid period arrives.

4. The scanning system according to claim 1,
wherein the information processing apparatus can receive a print request in addition to the scanning request via the Bot account registered in the message sharing system, and
wherein if the print request is received, the information processing apparatus posts a message prompting reading of the card information associated with an image processing apparatus in which printing is to be executed to the message sharing system via the Bot account registered in the message sharing system.

5. The scanning system according to claim 1,
wherein if an instruction about a scan to be posted to the message sharing system is provided from a user, the image processing apparatus displays a message prompting the user to read the card information on a display unit.

6. The scanning system according to claim 1,
wherein the card information is uniquely identifiable information that can be read from an IC card or a terminal incorporating an IC chip, in a terminal in which a user uses the message sharing system and the image processing apparatus.

7. A method in a scanning system including an information processing apparatus having a web application cooperating with a message sharing system and an image processing apparatus provided with a scanner and a reader, the method comprising:
transmitting, by the information processing apparatus, a card information request to a scanning request source in response to a scanning request from a user account belonging to the message sharing system;
receiving, by the information processing apparatus, card information from the scanning request source;
holding, by the web application, in a management table, the card information and destination information to which scan data generated based on scanning is to be posted in association with each other in a management table, wherein the destination information indicates a specification of a communication space of the message sharing system or a specification of a message of the message sharing system;
receiving, by the image processing apparatus, card information using the reader;
generating, by the image processing apparatus, scan data using the scanner;
transmitting, by the image processing apparatus, the scan data and the card information that has been read on the image processing apparatus for posting so that the scan data is posted to the message sharing system to the information processing apparatus;
receiving, by the information processing apparatus, the scan data and the card information from the image processing apparatus;
specifying, by the information processing apparatus, the destination information having been held in the management table in association with the card information received from the image processing apparatus;

posting, by the information processing apparatus, the scan data received from the image processing apparatus to the message sharing system, by designating the specified destination information; and deleting, by the information processing apparatus, the card information and destination information having been held in the management table.

8. An image processing apparatus provided with a scanner and a reader comprising:
a memory storing instructions; and
a processor executing instructions causing the image processing apparatus to:
receive card information using the reader;
generate scan data using the scanner; and
transmit, to an information processing apparatus having a web application cooperating with a message sharing system, the scan data and the card information so that the scan data is posted to the message sharing system,
wherein, in the information processing apparatus, destination information to which scan data generated based on scanning is to be posted and card information that received from a scanning request source of a scanning request from a user account belonging to the message sharing system have been held in advance in association with each other in the management table, and if the scan data and the card information are received from the image processing apparatus, the destination information having been held in the management table in association with the card information received from the image processing apparatus is specified, the scan data that received from the image processing apparatus are posted to the message sharing system by designating the specified destination information, and the card information and destination information having been held in the management table is deleted, and
wherein the destination information indicates a specification of a communication space of the message sharing system or a specification of a message of the message sharing system.

9. A method in an image processing apparatus provided with a scanner and reader, the method comprising:
receiving card information using the reader;
generating scan data using the scanner; and
transmitting, to an information processing apparatus having a web application cooperating with a message sharing system, the scan data and the card information so that the scan data is posted to the message sharing system,
wherein, in the information processing apparatus, destination information to which scan data generated based on scanning is to be posted and card information that received from a scanning request source of a scanning request from a user account belonging to the message sharing system have been held in advance in association with each other in the management table, and if the scan data and the card information are received from the image processing apparatus, the destination information having been held in the management table in association with the card information received from the image processing apparatus is specified, the scan data that received from the image processing apparatus are posted to the message sharing system by designating the specified destination information, and the card information and destination information having been held in the management table is deleted, and wherein the destination information indicates a specification of a communication space of the message sharing system or a specification of a message of the message sharing system.

10. A printing system including an image processing apparatus having a web application cooperating with a message sharing system, and an image processing apparatus provided with a printing device, the printing system comprising:
the image processing apparatus comprising:
a reader;
a printing device;
a memory storing first instructions; and
a processor executing first instructions causing the image processing apparatus to:
receive card information using the reader; and
transmit the card information in order to enable printing according to an instruction posted on the message sharing system and identification information of the image processing apparatus to the information processing apparatus,
the information processing apparatus comprising:
a memory storing second instructions related to the web application; and
a processor executing second instructions causing the information processing apparatus to:
receive the card information and the identification information of the image processing apparatus from the image processing apparatus;
hold, in a management table, the identification information of the image processing apparatus and the card information in association with each other;
transmit a card information request and an image request to be printed to a print request source in response to a print request from a user account belonging to the message sharing system;
receive card information and an image from the print request source, wherein the image that the information processor receives from the print request source is an image posted to the message sharing system by the print request source;
specify the image processing apparatus having been held in the management table associated with the card information received from the print request source;
instruct printing of the received image to the specified image processing apparatus; and
delete the identification information of the image processing apparatus and the card information having been held in the management table,
wherein the second instructions further cause the image processing apparatus to execute printing for the image in accordance with a print instruction from the information processing apparatus.

11. The printing system according to claim 10,
wherein, in response to the print request, the information processing apparatus posts a message prompting reading of the card information associated with the image processing apparatus and a message prompting posting of an image to be printed to the message sharing system via a Bot account registered in the message sharing system.

12. The printing system according to claim 10,
wherein the association between the identification information of the image processing apparatus and the card information has a valid period, and the information processing apparatus delete the identification information of the image processing apparatus and the card information from the management table when the valid period arrives.

13. The printing system according to claim 10,
wherein the web application can receive a scanning request in addition to the print request via a Bot account registered in the message sharing system,
wherein, if the scanning request is received, the web application posts a message for prompting the registration of the card information readable by an image processing apparatus in which scanning is to be executed and a message for prompting input of destination information to which the scan data generated based on scanning is to be posted to the message sharing system via the Bot account registered in the message sharing system, and
wherein the destination information indicates a specification of a communication space of the message sharing system or a specification of a message of the message sharing system.

14. A method in a printing system including an information processing apparatus having a web application cooperating with a message sharing system and an image processing apparatus provided with a printing device and a reader, the method comprising:
receiving, by the image processing apparatus, card information using the reader;
transmitting, by the image processing apparatus, the card information in order to enable printing according to an instruction posted on the message sharing system and identification information of the image processing apparatus to the information processing apparatus;
receiving, by the information processing apparatus, the card information and the identification information of the image processing apparatus from the image processing apparatus;
holding, by the information processing apparatus, the identification information of the image processing apparatus that has been received from the image processing apparatus and card information in association with each other in a management table;
transmitting, by the information processing apparatus, a card information request and an image request to be printed to a print request source in response to a print request from a user account belonging to the message sharing system;
receiving, by the information processing apparatus, card information and an image from the print request source, wherein the image that the information processor receives from the print request source is an image posted to the message sharing system by the print request source;
specifying, by the information processing apparatus, the image processing apparatus having been held in the management table associated with the card information received from the print request source;
instructing, by the information processing apparatus, printing for the image to the specified image processing apparatus; and
executing, by the image processing apparatus, printing for the image in accordance with a print instruction from the information processing apparatus; and
deleting, by the information processing apparatus, the identification information of the image processing apparatus and the card information having been held in the management table.

15. An image processing apparatus provided with a printing device and a reader comprising:
a memory storing instructions; and
a processor executing instructions causing the image processing apparatus to:
receive card information using the reader;
transmit the card information in order to enable printing according to an instruction posted on a message sharing system and identification information of the image processing apparatus to an information processing apparatus having a web application cooperating with the message sharing system; and
execute printing for the image according to a print instruction from the information processing apparatus,
wherein, in the information processing apparatus, the card information and the identification information of the image processing apparatus that have been received from the image processing apparatus are held in association with each other in a management table, a card information request associated and an image request to be printed are transmitted to a print request source in response to a print request from a user account belonging to the message sharing system, a card information and an image are received from the print request source, the image processing apparatus having been held in the management table associated with the card information received from the print request source is specified, and a print instruction for printing the image is transmitted to the image processing apparatus associated with the card information, and
wherein the image that the information processor receives from the print request source is an image posted to the message sharing system by the print request source.

16. A method in an image processing apparatus provided with a printing device and a reader, the method comprising:
receiving card information using the reader;
transmitting the card information in order to enable printing according to an instruction posted on a message sharing system and identification information of the image processing apparatus to an information processing apparatus having a web application cooperating with a message sharing system; and
executing printing of an image according to a print instruction from the information processing apparatus,
wherein, in the information processing apparatus, the card information and the identification information of the image processing apparatus that have been received from the image processing apparatus are held in association with each other in a management table, a card information request associated and an image request to be printed are transmitted to a print request source in response to a print request from a user account belonging to the message sharing system, a card information and an image are received from the print request source, the image processing apparatus having been held in the management table associated with the card information received from the print request source is specified, and a print instruction for printing an image is transmitted to the image processing apparatus associated with the card information, and
wherein the image that the information processor receives from the print request source is an image posted to the message sharing system by the print request source.

* * * * *